United States Patent [19]
Yin et al.

[11] Patent Number: 5,982,748
[45] Date of Patent: Nov. 9, 1999

[54] METHOD AND APPARATUS FOR CONTROLLING ADMISSION OF CONNECTION REQUESTS

[75] Inventors: Nanying Yin, Newton Center; Steven R. Willis, Acton, both of Mass.

[73] Assignee: Nortel Networks Corporation, Montreal, Canada

[21] Appl. No.: 08/726,061

[22] Filed: Oct. 3, 1996

[51] Int. Cl.[6] .............................. H04J 3/22; H04L 12/26; H04L 12/56
[52] U.S. Cl. ........................... 370/232; 370/253; 370/468
[58] Field of Search ................................... 370/229, 230, 370/231, 232, 234, 235, 252, 253, 389, 395, 465, 468, 477; 709/232, 233, 234, 235, 249

[56] References Cited

U.S. PATENT DOCUMENTS

| | | | |
|---|---|---|---|
| 5,132,966 | 7/1992 | Hayano et al. | 370/233 |
| 5,224,099 | 6/1993 | Corbalis et al. | 370/412 |
| 5,289,462 | 2/1994 | Ahmadi et al. | 370/232 |
| 5,313,454 | 5/1994 | Bustini et al. | 370/231 |
| 5,315,586 | 5/1994 | Charvillat | 370/232 |
| 5,341,366 | 8/1994 | Soumiya et al. | 370/234 |
| 5,347,511 | 9/1994 | Gun | 370/255 |
| 5,357,507 | 10/1994 | Hughes et al. | 370/234 |
| 5,408,465 | 4/1995 | Gusella et al. | 370/231 |
| 5,432,790 | 7/1995 | Hluchyj et al. | 370/412 |
| 5,434,848 | 7/1995 | Chimento, Jr. et al. | 370/232 |
| 5,463,620 | 10/1995 | Sriram | 370/468 |
| 5,519,689 | 5/1996 | Kim | 370/232 |
| 5,530,695 | 6/1996 | Dighe et al. | 370/395 |
| 5,581,544 | 12/1996 | Hamada et al. | 370/253 |
| 5,781,624 | 7/1998 | Mitra et al. | 379/220 |

*Primary Examiner*—Alpus H. Hsu
*Attorney, Agent, or Firm*—Blakely Sokoloff Taylor & Zafman LLP

[57] ABSTRACT

A system controls the admission of a connection request based on available resources. The received connection request specifies a particular class of service. The system then determines the allocated bandwidth for the specified class of service. Available resources for the specified class of service are determined based on measured traffic flow and the allocated bandwidth associated with the specified class of service. The connection request is accepted if the available resources are capable of supporting the requested connection. An allocation factor may be used by the system to allocate bandwidth. The allocation factor can be updated based on changes in measured traffic flow. Additionally, subscribed traffic parameters may be used to determine available resources for the specified class of service.

25 Claims, 8 Drawing Sheets

METHOD AND APPARATUS FOR CONTROLLING ADMISSION OF CONNECTION REQUESTS

BACKGROUND OF THE INVENTION

1. Field of the Invention

The present invention relates to network devices and, more specifically, to systems for controlling the admission of connection requests and the allocation of bandwidth in a network environment.

2. Background

Networks frequently utilize control systems for allocating bandwidth among various nodes and across various links in a network. The control systems also control the admission of connection requests received by nodes in a network. These control systems are generically referred to as Connection Admission Controllers (CACs). CACs define a set of actions or rules to be followed by the network nodes to determine whether a new connection should be accepted or rejected. The functions provided by a Connection Admission Controller are performed at the connection level and guarantee that particular Quality of Service (QoS) requirements (e.g., delay and loss limitations) are maintained for each data flow. The Connection Admission Controller promotes and maintains an efficient utilization of network resources such as transmission line bandwidth.

In a typical network, network nodes receive connection requests including required QoS parameters as well as traffic parameters for the requested connection. Additionally, each connection request may specify a particular class of service for the data flow. The required QoS parameters may include bandwidth requirements, transmission delay, or the loss ratio for the requested data flow. The traffic parameters for the connection request may include Peak Cell Rate (PCR), Sustainable Cell Rate (SCR), Minimum Cell Rate (MCR), and Burst Tolerance (BT), depending on the traffic class for the connection. These traffic parameters are discussed in greater detail below.

Various classes of traffic service may be requested for a particular data flow. Constant Bit Rate (CBR) traffic provides a constant (or nearly constant) flow of data. Variable Bit Rate (VBR) is used for data flows in which the data rate is variable. Different types of Variable Bit Rates may be specified, including real-time Variable Bit Rate traffic (rt-VBR) and non-real-time Variable Bit Rate traffic (nrt-VBR). rt-VBR is useful for transmitting real-time information such as voice data or live video. nrt-VBR is useful for data flows which are variable, but do not require the stringent real-time QoS parameters. Available Bit Rate (ABR) service utilizes a varying portion of the bandwidth depending on the traffic conditions of the current data flows that may include the connections on the other service classes. Finally, Unspecified Bit Rate (UBR) service may be requested without specifying any particular QoS parameters. UBR data is serviced when excess resources are available.

Peak Cell Rate (PCR) describes the data transfer rate in the Constant Bit Rate service class and the maximum transfer rate in other classes of service. The Sustainable Cell Rate (SCR) is the required average cell transfer rate in a time interval described by Burst Tolerance (BT) for a Variable Bit Rate service class (either real-time or non-real-time). Burst Tolerance also specifies the maximum possible burst in the cell flow in a Variable Bit Rate service class. Minimum Cell Rate (MCR) is the minimum cell transfer rate in the Available Bit Rate service class.

Known systems for controlling admission of connection requests and allocating bandwidth utilize information provided by the traffic parameters in the connection request. However, these known systems do not consider the actual (or measured) data flow resulting from previously accepted connection requests. Instead, these systems rely on the traffic parameters provided in the connection request to allocate bandwidth and control admission of subsequent connection requests. Such a system may reject a subsequent connection request if, for example, the Peak Cell Rate information provided in the existing (accepted) connections do not permit addition of the new connection request. However, such a rejection may be unwarranted if the actual (or measured) data flow is less than the peak data flow specified in the connection request. In this situation, the bandwidth is not being utilized effectively and connection requests may be rejected when actual bandwidth is available to support the requested connection.

Therefore, it is desirable to provide a system for controlling admission of connection requests and allocating bandwidth in response to information contained in traffic parameters as well as actual traffic flow measurements for the various classes of service supported.

SUMMARY OF THE INVENTION

An embodiment of the present invention provides a system for controlling the admission of connection requests in a network node. The received connection request specifies a particular class of service. The system then determines the allocated bandwidth for the specified class of service. Available resources for the specified class of service are determined based on measured traffic flow and the allocated bandwidth associated with the specified class of service. The connection request is accepted by the system if the available resources are capable of supporting the requested connection.

Another feature of the invention provides an allocation factor used by the system to allocate bandwidth. The allocation factor may be calculated and updated in response to changes in measured traffic flow.

Other aspects of the invention consider subscribed traffic parameters to determine available resources for the specified class of service.

Another feature of the present invention provides for the over-subscription of allocated bandwidth for the specified class of service.

A particular embodiment of the invention is implemented in an asynchronous transfer mode (ATM) switch.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1:
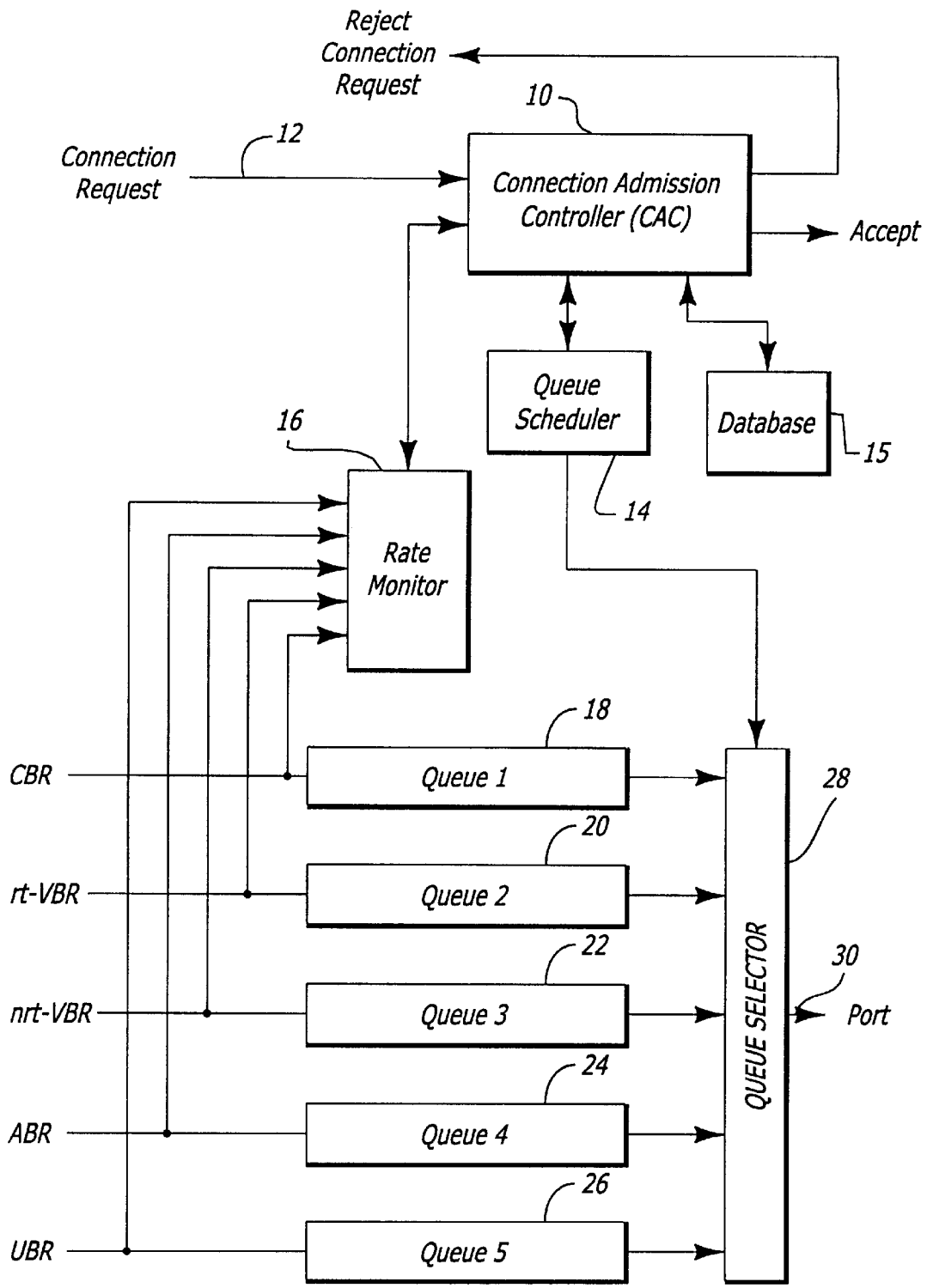
FIG. 1 illustrates an embodiment of a network node capable of implementing the present invention.

The following detailed description sets forth numerous specific details to provide a thorough understanding of the invention. However, those skilled in the art will appreciate that the invention may be practiced without these specific details. In other instances, well-known methods, procedures, components, and circuits have not been described in detail so as not to obscure the invention.

The present invention is related to a system for controlling admission of connection requests and allocating bandwidth to ensure efficient use of network resources. A Connection Admission Controller (CAC) provides a set of actions or rules to be considered by the network and each switching element or node in the network when determining whether to accept or reject a particular connection request. A CAC is an element of network traffic management and controls the flow of data at the connection level. When a new connection request is received by a node in the network, the CAC determines whether a particular link or links can accept the new connection. Before accepting the new connection, the CAC must determine that the new connection will receive, at minimum the Quality of Service (QoS) requirements requested as well as maintain the QoS guaranteed to all existing connections.

The determinations made by the CAC are based on network resource availability, QoS guarantees made to existing connections, and the required QoS for the requested connection. Each connection request contains the required QoS parameters, connection traffic parameters, and the class of service for the requested connection.

Table 1 below illustrates QoS and traffic parameters utilized with different classes of service.

TABLE 1

| Service Class | Traffic Parameters | Cell Loss Ratio (CLR) | Cell Delays (CTD, CDV) |
| --- | --- | --- | --- |
| Available Bit Rate (ABR) | PCR MCR | Specified | Unspecified |
| Constant Bit Rate (CBR) | PCR CDVT | Specified | Specified |
| real-time Variable Bit Rate (rt-VBR) | PCR SCR BT | Specified | Specified |
| non-real-time Variable Bit Rate (nrt-VBR) | PCR SCR BT | Specified | Unspecified |

As illustrated in Table 1, the PCR and MCR traffic parameters are associated with the ABR service class. The various traffic parameters for the CBR and VBR service classes are also shown. Cell Delay Variance Tolerance (CDVT) defines the time interval used to specify the Peak Cell Rate. Additionally, Table 1 illustrates the Cell Loss Ratio (CLR) and Cell Delays, including the Cell Transfer Delay (CTD) and Cell Delay Variance (CDV). Generally, the Cell Loss Ratio is the ratio of the number lost cells to the total number of cells transmitted during a particular time period. Regarding the cell delay variables, the Cell Transfer Delay is the elapsed time between transmission of the cell by a source and receipt of the cell by a destination. The Cell Delay Variance indicates the variability of cell arrival intervals. Table 1 indicates whether or not the Cell Loss Ratio and/or Cell Delays are specified for each service class.

Typically, the total transmission port bandwidth for a particular node is partitioned among the various service classes that may be transmitted through the port. As shown in Table 2, the bandwidth allocated to each service class need not be uniform.

TABLE 2

| Service Class | Bandwidth Allocated to Service Class |
| --- | --- |
| Available Bit Rate (ABR) | 35% |
| Constant Bit Rate (CBR) | 20% |
| real-time Variable Bit Rate (rt-VBR) | 20% |
| non-real-time Variable Bit Rate (nrt-VBR) | 25% |

Those of ordinary skill in the art will appreciate that Table 2 represents one possible allocation of bandwidth among various service classes. This bandwidth partitioning may be performed by a queue scheduler algorithm or similar procedure.

FIG. 1 illustrates an embodiment of a network node capable of implementing the teachings of the present invention. The node illustrated in FIG. 1 may be a router, an Asynchronous Transfer Mode (ATM) switch, or any other network device capable of directing various data flows across a port. A Connection Admission Controller (CAC) 10 receives connection requests on input 12. Based on information received from a local database 15 and a rate monitor 16, Connection Admission Controller 10 determines whether to accept the connection request and send the request to the next node or reject the connection request and generate a connection refusal signal. Database 15 stores information regarding existing connections and bandwidth allocations for the various service classes supported. The information stored in database 15 is updated in response to the addition of new connections or the removal of existing connections. In addition to controlling admission of connection requests, CAC 10 allocates the total port bandwidth among the various classes of service supported by the network node.

In the exemplary node of FIG. 1, five data queues are provided, each supporting a different class of service. Queue 18 receives Constant Bit Rate traffic, queue 20 receives real-time Variable Bit Rate traffic, and queue 22 receives non-real-time Variable Bit Rate traffic. Similarly, queue 24 receives Available Bit Rate traffic and queue 26 receives Unspecified Bit Rate traffic.

Rate monitor 16 is coupled to Connection Admission Controller 10 and the input of each queue 18–26. Thus, rate monitor 16 measures traffic flow for each class of service as the data flows into the corresponding queue.

The output of each queue 18–26 is coupled to a queue selector 28. Queue scheduler 14 provides a signal to queue selector 28 indicating the data queue to service at that particular time. Queue selector 28 selects the identified queue and transmits the queue's data to port 30.

By using the data collected by rate monitor 16, CAC 10 is able to modify the bandwidth allocation for the node to ensure maximum utilization of the available bandwidth.

Thus, the system illustrated in FIG. 1 provides dynamic allocation of bandwidth resources, thereby adapting to changing network configurations and changing network traffic. As the bandwidth allocation is modified or updated by CAC 10, a corresponding signal is provided to queue scheduler 14 to adjust the manner in which queues 18–26 are serviced by queue selector 28.

Figure 2:
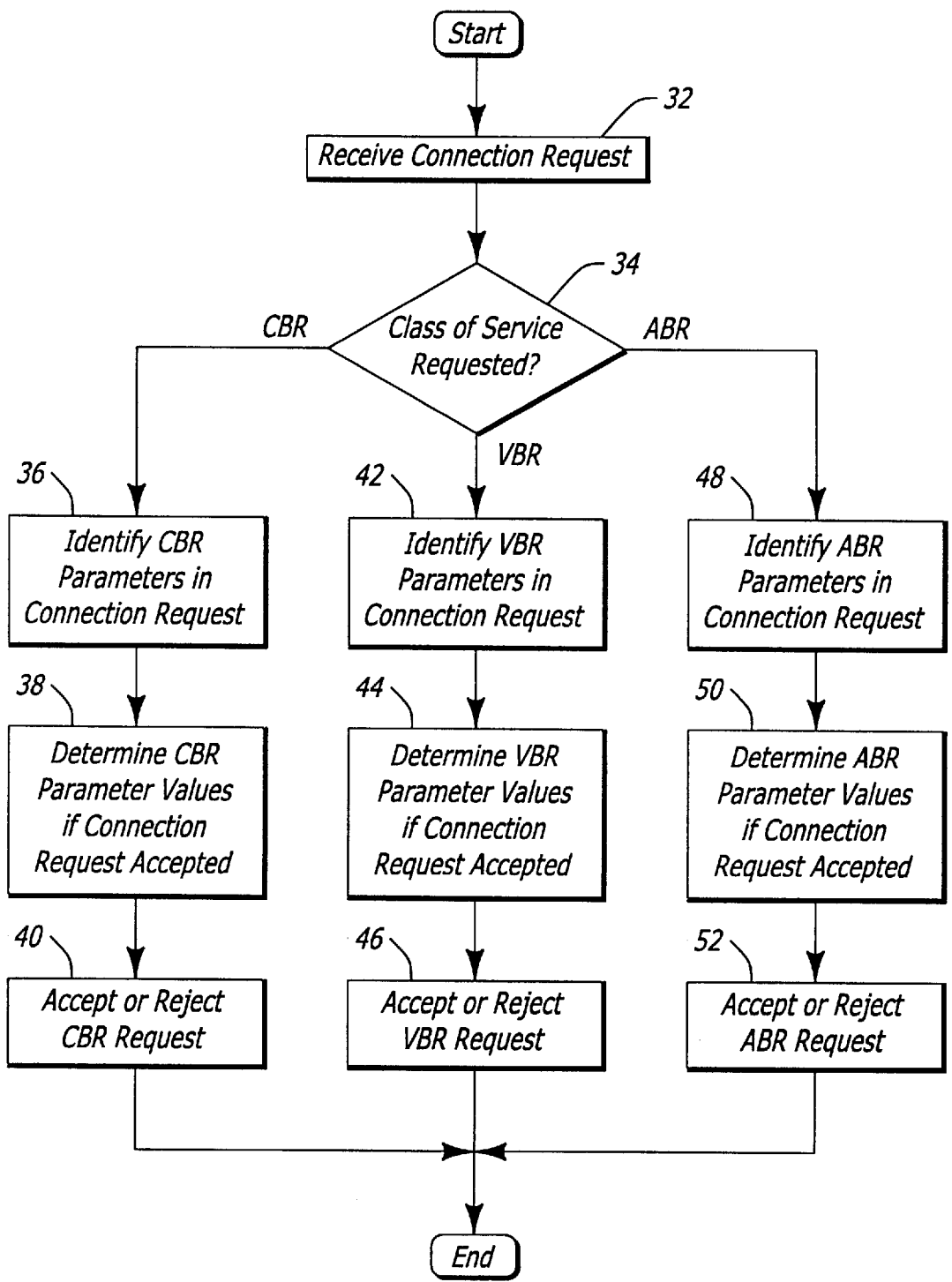
FIG. 2 illustrates an embodiment of a procedure for accepting or rejecting connection requests.

FIG. 2 illustrates the overall operation of an embodiment of a procedure for accepting or rejecting connection requests. The procedure of FIG. 2 may be executed, for example, by Connection Admission Controller 10 shown in FIG. 1. At step 32 of FIG. 2, a connection request is received by CAC 10. Step 34 then determines the class of service required by the connection request. In this embodiment, three different classes of service are available: CBR, VBR, and ABR. If the class of service requested is CBR, the procedure branches to step 36 where the CBR parameters in the connection request are identified. Step 38 then determines the CBR parameter values if the connection request is accepted; i.e., how would accepting the connection request change existing CBR parameters. In response to the determination in step 38, step 40 determines whether to accept or reject the CBR connection request. Additional details regarding the determination of whether to accept or reject a connection request are provided below.

If the class of service requested at step 34 is VBR, then step 42 identifies existing VBR parameters and step 44 determines the parameter values if the connection request is accepted. Step 46 then accepts or rejects the VBR connection request in response to the determination performed at step 44.

Similarly, if the class of service requested at step 34 is ABR, then step 48 identifies existing ABR parameters and step 50 determines the parameter values if the connection request is accepted. Step 52 accepts or rejects the ABR connection request in response to the determination performed at step 50.

Although FIG. 2 illustrates support for three different classes of service, the teachings of the present invention may be practiced with any number of different service classes. Additionally, the determinations performed at steps 38, 44, and 50 may include an analysis of actual traffic flow for the requested class of service, as described in greater detail below.

Figure 3:
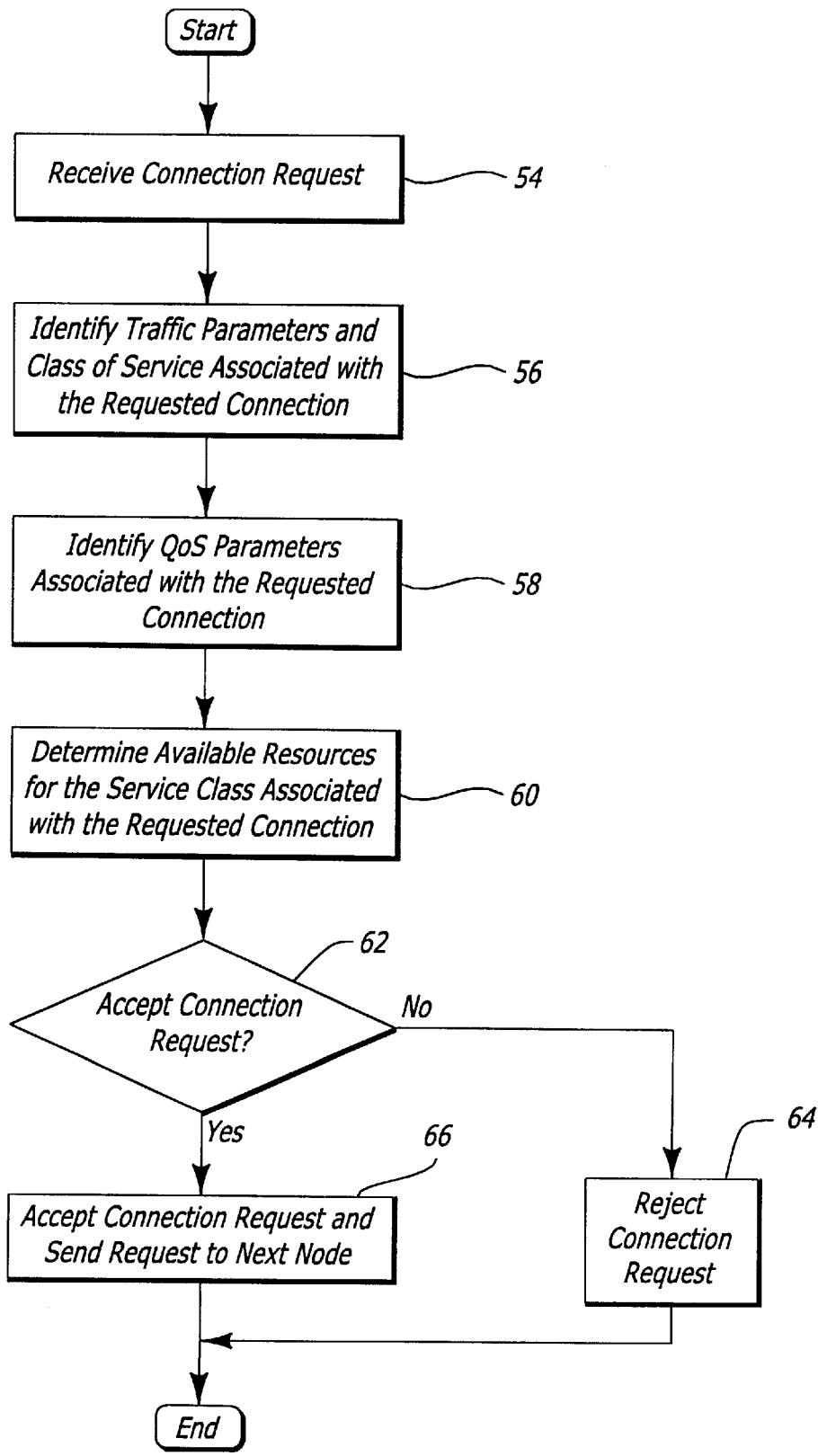
FIG. 3 shows an embodiment of a procedure for determining whether to accept or reject a particular connection request.

FIG. 3 illustrates an embodiment of a procedure for determining whether to accept or reject a connection request for a particular class of service. The procedure of FIG. 3 may be executed by one or more nodes or network devices. In the exemplary network node shown in FIG. 1, the procedure may be executed by Connection Admission Controller 10.

At step 54 of FIG. 3, a connection request is received containing various traffic parameters and QoS requirements for the requested connection. The connection request may be received from any node in the network coupled to the node performing this procedure. At step 56, the procedure identifies the traffic parameters and class of service associated with the requested connection. Step 58 then determines the QoS parameters associated with the requested connection. The traffic parameters, class of service, and QoS parameters are contained within the connection request.

Step 60 of FIG. 3 determines the available resources for the class of service associated with the requested connection. The available resources are determined by considering the total resources available to the requested class of service and the resources already assigned to existing connections using the requested class of service. The determination performed at step 60 may consider the traffic parameters and QoS requirements of all existing connections for the requested class of service. Additionally, traffic flow measurements for existing connections may be considered in step 60. Traffic flow measurements may be obtained, for example, from a monitoring system such as rate monitor 16 shown in FIG. 1. Additional details regarding the determination of available resources are provided below.

After determining available resources, step 62 determines whether to accept or reject the connection request. As illustrated above in Table 1, different service classes may utilize different traffic parameters. Therefore, the calculations and procedures used to determine whether to accept or reject a connection request may vary depending on the particular service class associated with the connection request.

The determination performed at step 62 may consider the QoS requirements of the requested connection, the available resources, and the affect on existing connections if the connection request is accepted. These considerations maximize the utilization of the network resources while maintaining QoS requirements for each connection. The calculations performed in step 62 are further discussed below.

If step 62 determines not to accept the connection request, then the procedure branches to step 64 where the connection request is rejected, and a corresponding rejection signal is transmitted to the switching device or node generating the connection request. If step 62 determines that adequate resources are available for the connection request, then the procedure continues to step 66 where the connection request is accepted and sent to the next switching element or node in the network. Those of ordinary skill in the art will appreciate that the next node in the network may be determined using a variety of routing mechanisms, routing protocols, or other route determination systems.

As discussed above with reference to FIG. 3, various calculations may be used for each class of service to determine whether to accept or reject a connection request. These calculations may use a variable $B(i)$ to indicate the total bandwidth allocated to a particular service class i. Typically, $B(i)$ is represented as a percentage of the total bandwidth available to all service classes.

A variable $A(i)$ indicates the subscribed bandwidth of existing connections in service class i. The subscribed bandwidth is determined from the traffic parameters received in the connection requests for the existing connections. Different traffic parameters are used to determine $A(i)$ depending on the type of service class. Table 3 below illustrates the parameters used for several service classes.

TABLE 3

| Service Class | A(i) Traffic Parameter |
| --- | --- |
| Available Bit Rate (ABR) | Minimum Cell Rate (MCR) |
| Constant Bit Rate (CBR) | Peak Cell Rate (PCR) |
| real-time Variable Bit Rate (rt-VBR) | Sustainable Cell Rate (SCR) |
| non-real-time Variable Bit Rate (nrt-VBR) | Sustainable Cell Rate (SCR) |

Thus, $A(i)$ for an ABR service class is the sum of all MCR values contained in the connection requests for the existing connections. Similarly, $A(i)$ for CBR is the sum of all PCR values, and $A(i)$ for VBR (either real-time or non-real-time) is the sum of all SCR values.

Another variable, $load(i)$, indicates the current measured usage for service class i:

$$load(i) = \frac{\text{Actual Usage}}{B(i)}$$

The maximum value of load(i) is one.

A variable G_load(i) represents the ratio of the actual user rate to the subscribed rate, and is defined by the following equation:

$$G\_load(i) = \frac{\text{Actual Usage}}{A(i)}$$

G_load(i) identifies the actual load being placed on a particular service class i.

An allocation factor is used to determine the bandwidth allocation among the various service classes. Each service class i has an associated allocation factor, f(i). The allocation factor for each service class is dynamic. Thus, the allocation factors may change in response to measured traffic flow for each service class. The allocation factor is defined by the following equation:

$$f(i) = \frac{\text{Maximum Allowed } A(i)}{B(i)} = \frac{load(i)}{G\_load(i)}$$

As mentioned above, A(i) represents the subscribed bandwidth of existing connections for service class i. Thus, f(i) represents the ratio of the subscribed bandwidth to the total bandwidth.

Allocation factor f(i) indicates whether the associated service class is fully booked, under-subscribed, or over-subscribed. A service class is fully booked when f(i)=1, indicating that the maximum allowable subscribed bandwidth equals the bandwidth allocated to the service class. A service class is under-subscribed when f(i)<1, indicating that the maximum allowable subscribed bandwidth is less than the allocated bandwidth. It may be desirable to under-subscribe a service class when a stringent QoS requirement is requested.

A service class is over-subscribed when f(i)>1, indicating that the maximum allowable subscribed bandwidth is greater than the allocated bandwidth. In this situation, the subscribed bandwidth indicated by the traffic parameters exceeds the bandwidth allocated to the service class. Over-subscription may be utilized when measured traffic flow for the particular service class is less than the subscribed bandwidth indicated by the traffic parameters in the connection request. Since the measured traffic is less than the subscribed value, the allocation factor f(i) is adjusted to permit over-subscription of the service class. This over-subscription permits the acceptance of additional connection requests that might otherwise be rejected due to a fully-subscribed bandwidth. Additional details regarding allocation factor f(i) are provided below.

As previously mentioned, a particular node in a network may be capable of handling connections for multiple service classes. For example, a particular node may be capable of handling four different service classes (CBR, rt-VBR, nrt-VBR, and ABR). In this example, the above-described variables may be assigned as shown in Table 4 below.

TABLE 4

| Service Class | B(i) | A(i) | load(i) | G_load(i) | f(i) |
|---|---|---|---|---|---|
| CBR (1) | B(1) | A(1) | load(1) | G_load(1) | f(1) |
| rt-VBR (2) | B(2) | A(2) | load(2) | G_load(2) | f(2) |
| nrt-VBR (3) | B(3) | A(3) | load(3) | G_load(3) | f(3) |
| ABR (4) | B(4) | A(4) | load(4) | G_load(4) | f(4) |

Note that CBR may also be referred to as service class 1, rt-VBR as service class 2, nrt-VBR as service class 3, and ABR as service class 4.

As shown above in Table 3, different service classes may use different traffic parameters to calculate subscribed bandwidth and other variables. Similarly, each service class may have a different measured traffic rate. Therefore, different procedures may be used to determine when to accept or reject a connection request based on the requested service class.

Figure 4:
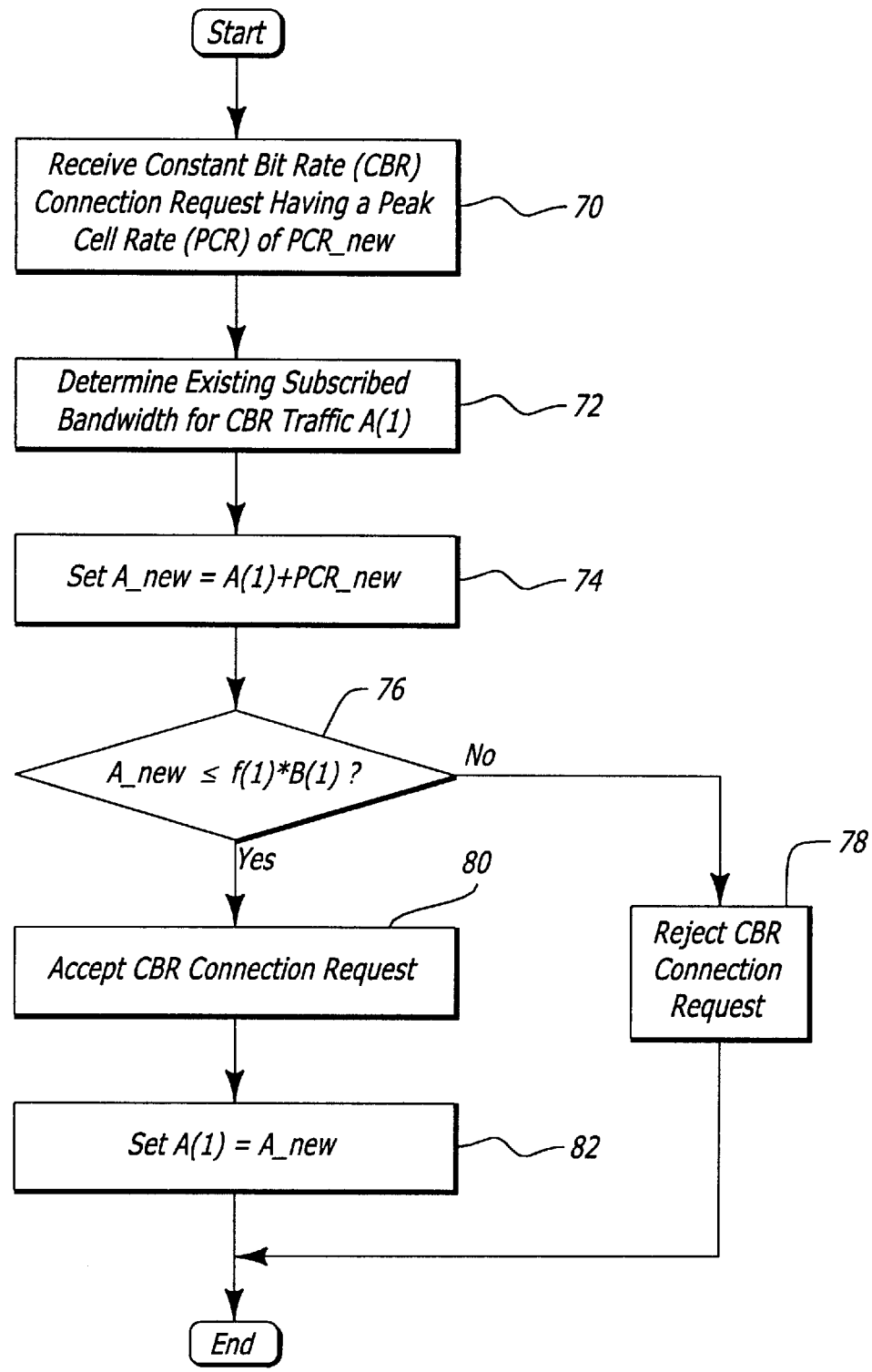
FIG. 4 illustrates an embodiment of the invention capable of determining whether to accept or reject a connection request for a Constant Bit Rate service class.

FIG. 4 illustrates an embodiment of the invention capable of determining whether to accept or reject a connection request for a Constant Bit Rate service class. At step 70, a CBR connection request is received having a Peak Cell Rate (PCR) of PCR_new. At step 72, the procedure determines the value of A(1), representing the existing subscribed bandwidth for CBR traffic. At step 74, the procedure determines the new subscribed bandwidth A_new for CBR traffic if the connection request is accepted. This is determined by adding the existing value of A(1) to the PCR of the requested connection.

Step 76 of FIG. 4 determines whether A_new≦f(1)*B(1). If A_new exceeds f(1)*B(1) in step 76, then the procedure branches to step 78 where the CBR connection request is rejected by sending a rejection signal to the node that generated the connection request. If A_new does not exceed f(1)*B(1), then the procedure continues to step 80 where the CBR connection request is accepted and the connection request is sent to the next node in the network. At step 82, the subscribed CBR bandwidth is changed to the value of A_new to reflect the accepted connection traffic parameters.

When an existing CBR connection is cleared from a node, A(i) is reduced by the PCR value of the cleared connection. Allocation factor f(i) for a CBR service class may have different values depending on the call scheduling algorithm for the CBR class. For example, if the CBR service class receives the highest priority, then the allocated bandwidth B(i) can be fully subscribed, such that f(i)=1.0. However, if the CBR service class is not the highest priority, then the allocation factor may be less than one.

Figure 5:
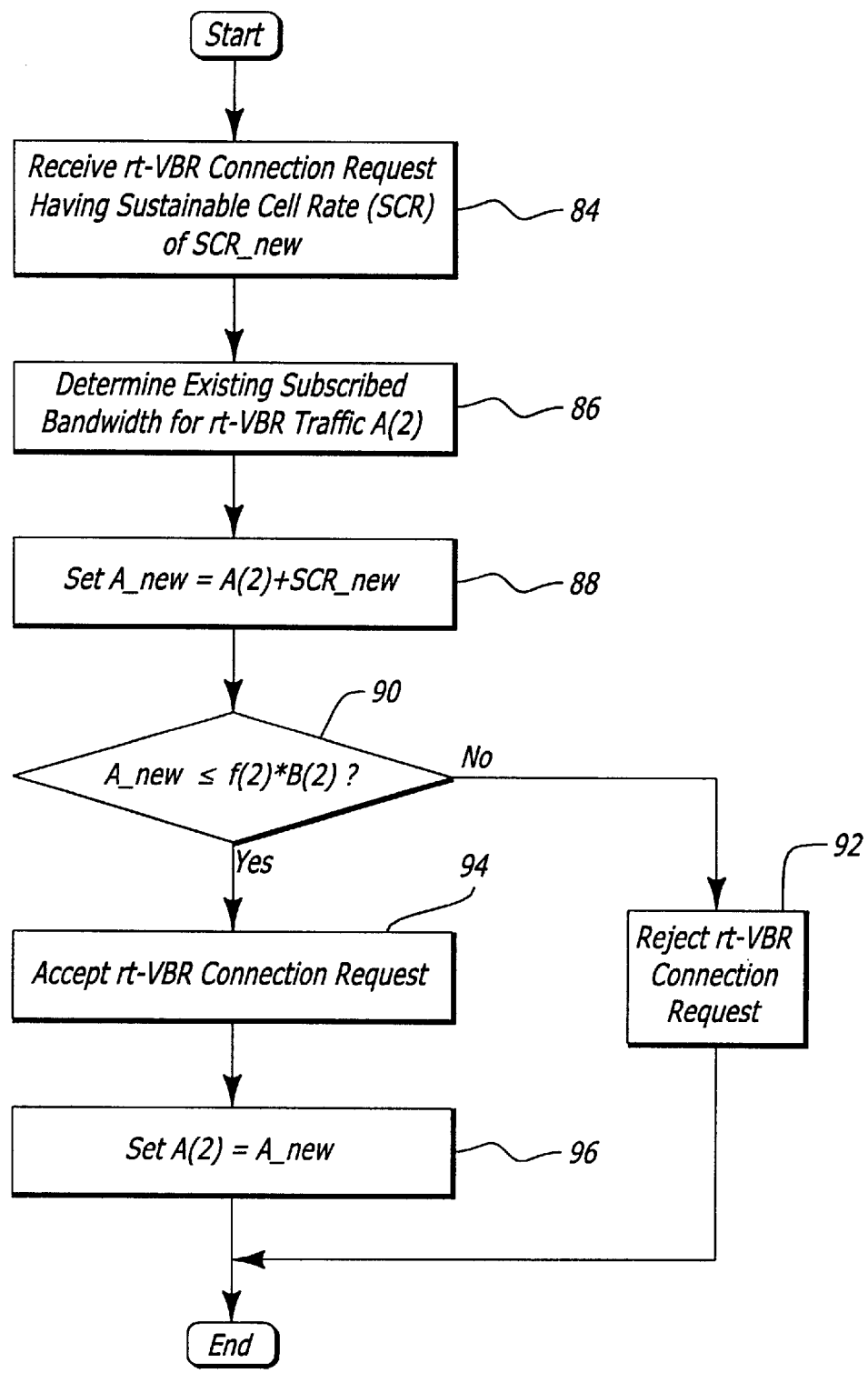
FIG. 5 illustrates an embodiment of a procedure for determining whether to accept or reject a connection request for a real-time Variable Bit Rate service class.

FIG. 5 illustrates an embodiment of the invention for determining whether to accept a connection request for a real-time Variable Bit Rate service class. At step 84, a rt-VBR connection request is received having a Sustainable Cell Rate (SCR) of SCR_new. At step 86, the procedure determines the value of A(2), representing the existing subscribed bandwidth for rt-VBR traffic. At step 88, the procedure determines the new subscribed bandwidth A_new for rt-VBR traffic if the connection request is accepted. This is determined by adding the existing value of A(2) to the SCR of the requested connection.

Step 90 of FIG. 5 determines whether A_new≦f(2)*B(2). The allocation factor f(2) is multiplied by the allocated rt-VBR bandwidth to increase (over-subscribe) or decrease (under-subscribe) the rt-VBR service. For example, if f(2)= 1.2, then new connection requests are accepted until the new subscribed bandwidth A_new exceeds the allocated bandwidth B(2) by 20%. Similarly, if f(2)=0.8, new connection requests are accepted until A_new reaches 80% of the allocated bandwidth B(2).

If A_new exceeds f(2)*B(2) in step 90, then the procedure branches to step 92 where the rt-VBR connection request is rejected by sending a rejection signal to the node that generated the connection request. If A_new does not exceed f(2)*B(2), then the procedure continues to step 94 where the rt-VBR connection request is accepted and the connection request is sent to the next node in the network. At step 96, the subscribed rt-VBR bandwidth is changed to the value of A_new to reflect the accepted connection traffic parameters.

When an existing rt-VBR connection is cleared from a node, A(i) is reduced by the SCR value of the cleared connection. Allocation factor f(i) for a rt-VBR service class may be adjusted in response to changes in measured rt-VBR traffic flow.

As discussed above, allocation factor f(i) may be represented as:

$$f(i) = \frac{\text{Maximum Allowed } A(i)}{B(i)}$$

However, f(i) may also be represented as:

$$f(i) = \frac{load(i)}{G\_load(i)}$$

Using this second representation of f(i), G_load(i) may initially be set to a default value by the network administrator. This default value may be based on known or anticipated usage of the network and particular nodes in the network. After a period of time, the value of G_load(i) may be updated to reflect measured traffic flow through the node. When measured traffic flow becomes available, G_load(i) may be updated using the following equation:

$$G\_load(i) = \frac{\text{Measured Rate}}{A(i)}$$

After G_load(i) is updated, the value of f(i) can be updated using the second formula for f(i), above.

The characteristics of non-real-time Variable Bit Rate data may be different from the characteristics of real-time-VBR data. The nrt-VBR data may have a wide range of SCR and BT values for different applications or types of data. Therefore, the connection admission procedure for nrt-VBR is different from the procedure for rt-VBR.

Figure 6:
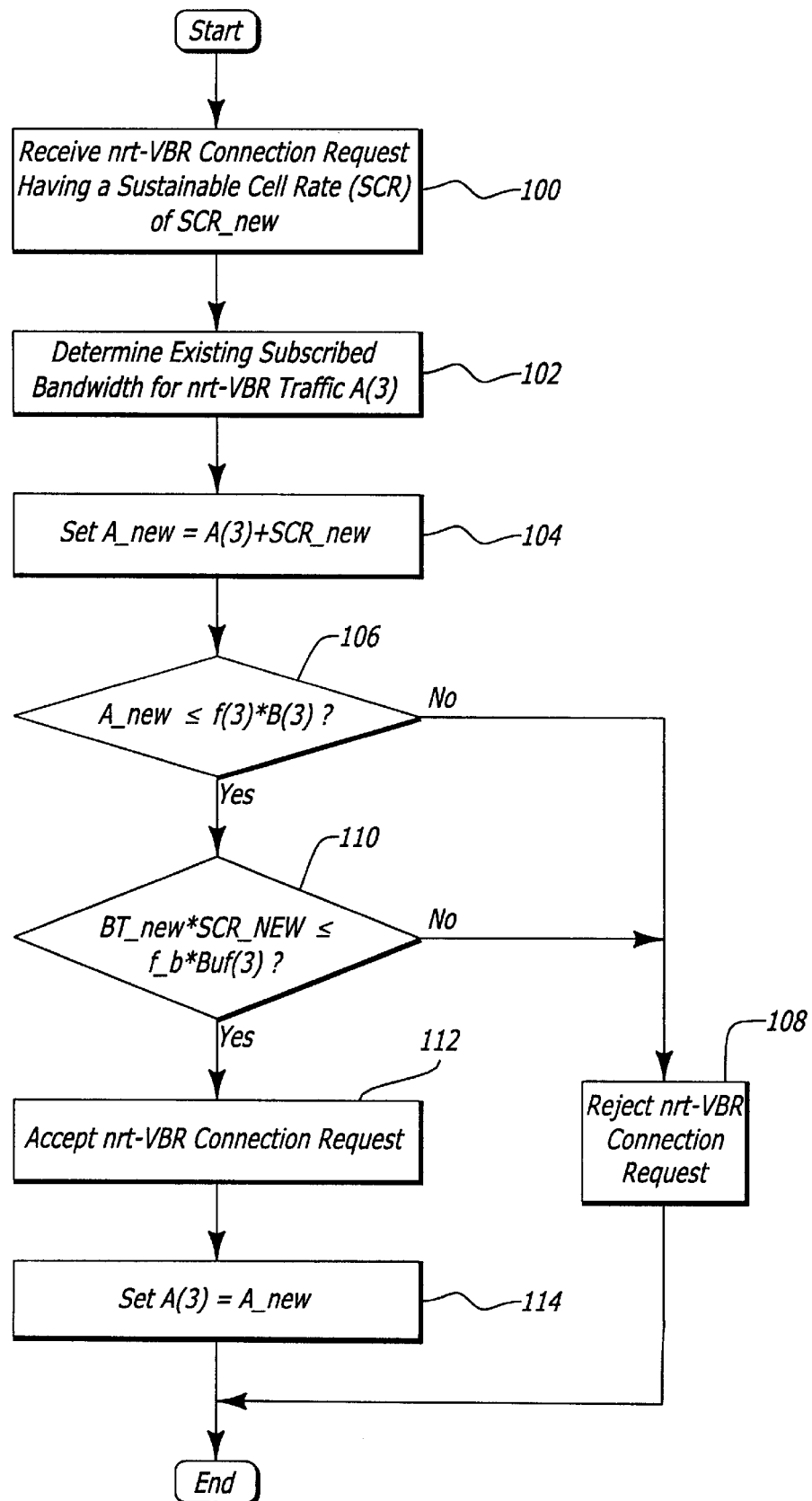
FIG. 6 shows an embodiment of a procedure for determining whether to accept or reject a connection request for a non-real-time Variable Bit Rate service class.

FIG. 6 illustrates an embodiment of the invention for determining whether to accept or reject a connection request for a nrt-VBR service class. At step 100, a nrt-VBR connection request is received having a Sustainable Cell Rate (SCR) of SCR_new. At step 102, the procedure determines the value of A(3), representing the existing subscribed bandwidth for nrt-VBR traffic. At step 104, the procedure determines the new subscribed bandwidth A_new for nrt-VBR traffic if the connection request is accepted. This is determined by adding the existing value of A(3) to the SCR of the requested connection.

Step 106 of FIG. 6 determines whether A_new≦f(3)*B(3). If A_new exceeds f(3)*B(3) in step 106, then the procedure branches to step 108 where the nrt-VBR connection request is rejected by sending a rejection signal to the node that generated the connection request. If A_new does not exceed f(3)*B(3) in step 106, then the procedure continues to step 110 to determine whether BT_new*SCR_new≦f_b*Buf(3). BT_new is the Burst Tolerance of the connection request and Buf(3) represents the buffer pool size for the nrt-VBR service class. Variable f_b is the buffer allocation parameter; i.e., the portion of the buffer which may be utilized to store the maximum data burst of the connection. Since the capacity of the buffer generally should not be exceeded, the value of f_b should be less than one. In an embodiment of the invention using a bursty source model, f_b is defined as:

$$f\_b = \frac{1 - load(3)}{1 - G\_load(3)} \cdot \frac{\ln\left\{\frac{1 - G\_load(3)}{P\_G}\right\}}{\ln\left\{\frac{1 - load(3)}{CLR(3)}\right\}}$$

Where P_G is the Generic Cell Rate Algorithm (GCRA), or leaky bucket, mark/loss probability and CLR(3) is the maximum guaranteed Cell Loss Rate for the nrt-VBR service class. Additionally, G_load(3) may be defined as:

$$G\_load(3) = \frac{\text{Measured } nrt - VBR \text{ Traffic Rate}}{A(3)}$$

The value of load(3) may be configured by the network administrator. A typical default value for load(3) in a nrt-VBR class is load(3)=0.8.

If the comparison is not satisfied at step 110 of FIG. 6, then the procedure branches to step 108 where the nrt-VBR connection request is rejected. But, if the comparison in step 110 is satisfied, then step 112 accepts the nrt-VBR connection request and sends the connection request to the next node in the network. At step 114, the subscribed nrt-VBR bandwidth is changed to the value of A_new to reflect the accepted connection traffic parameters.

As discussed above with respect to rt-VBR service, the allocation factor f(i) for a nrt-VBR service class may be adjusted in response to changes in measured nrt-VBR traffic flow. This adjustment of f(i) is performed by recalculating f(i) according to:

$$f(3) = \frac{load(3)}{G\_load(3)}$$

Figure 7:
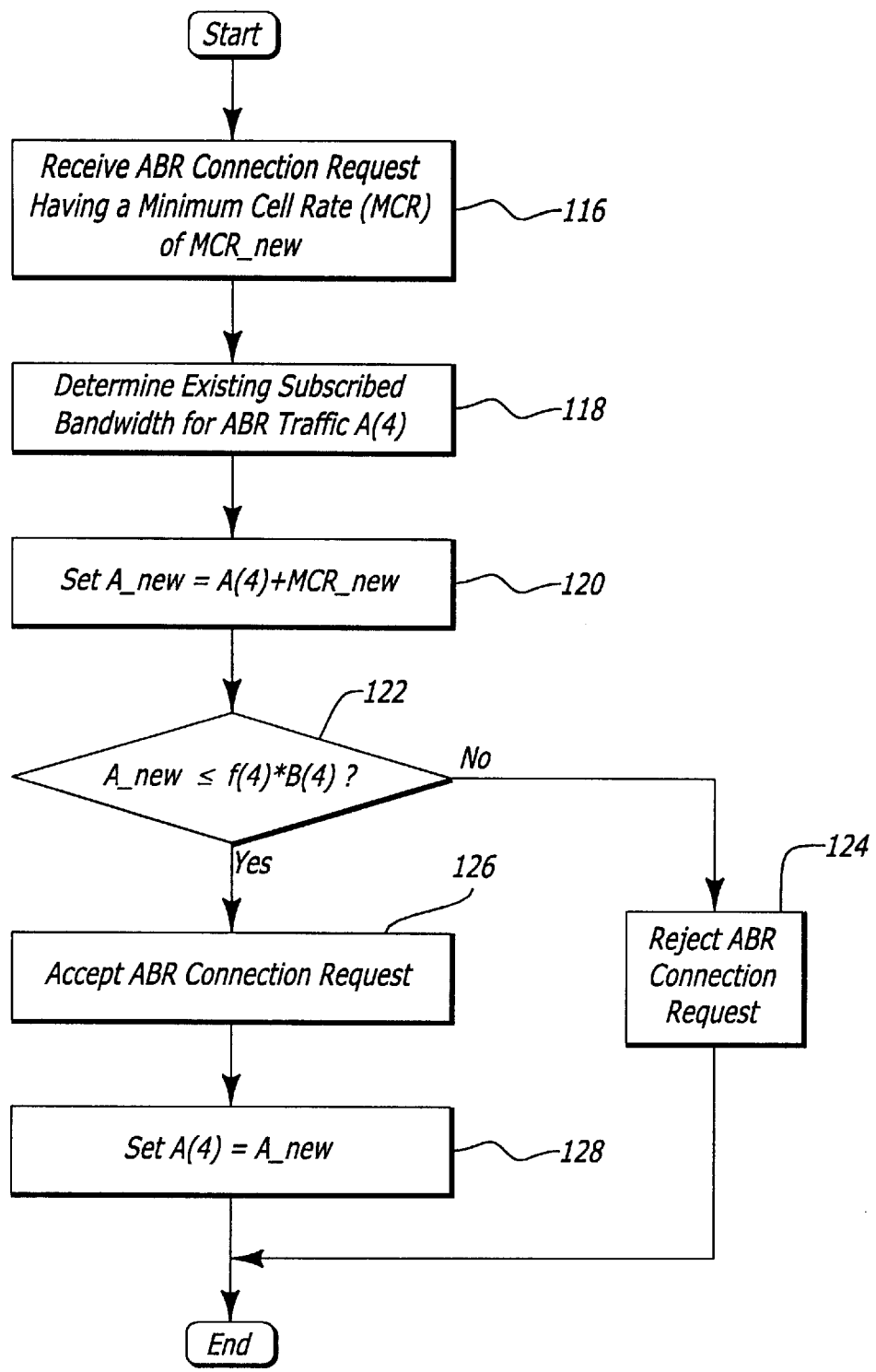
FIG. 7 illustrates an embodiment of a procedure for determining whether to accept or reject a connection request for an Available Bit Rate service class.

FIG. 7 illustrates an embodiment of the invention for determining whether to accept or reject a connection request for an Available Bit Rate service class. At step 116, an ABR connection request is received having a Minimum Cell Rate (MCR) of MCR_new. At step 118, the procedure determines the value of A(4), representing the existing subscribed bandwidth for ABR traffic. At step 120, the procedure determines the new subscribed bandwidth A_new for ABR traffic if the connection request is accepted. This is determined by adding the existing value of A(4) to the MCR of the requested connection. MCR is the minimum bandwidth that the network should provide under all conditions.

Step 122 of FIG. 7 determines whether A_new≦f(4)*B(4) . If A_new exceeds f(4)*B(4) in step 122, then the procedure branches to step 124 where the ABR connection request is rejected by sending a rejection signal to the node that generated the connection request. If A_new does not exceed f(4)*B(4), then the procedure continues to step 126 where the ABR connection request is accepted and the connection request is sent to the next node in the network.

At step 128, the subscribed ABR bandwidth is changed to the value of A_new to reflect the accepted connection traffic parameters.

When an existing ABR connection is cleared from a node, A(i) is reduced by the MCR value of the cleared connection. Allocation factor f(i) for an ABR service class may be configured by the network administrator. For example, the allocation factor may be configured to have a default value f(i)=0.8.

Figure 8:
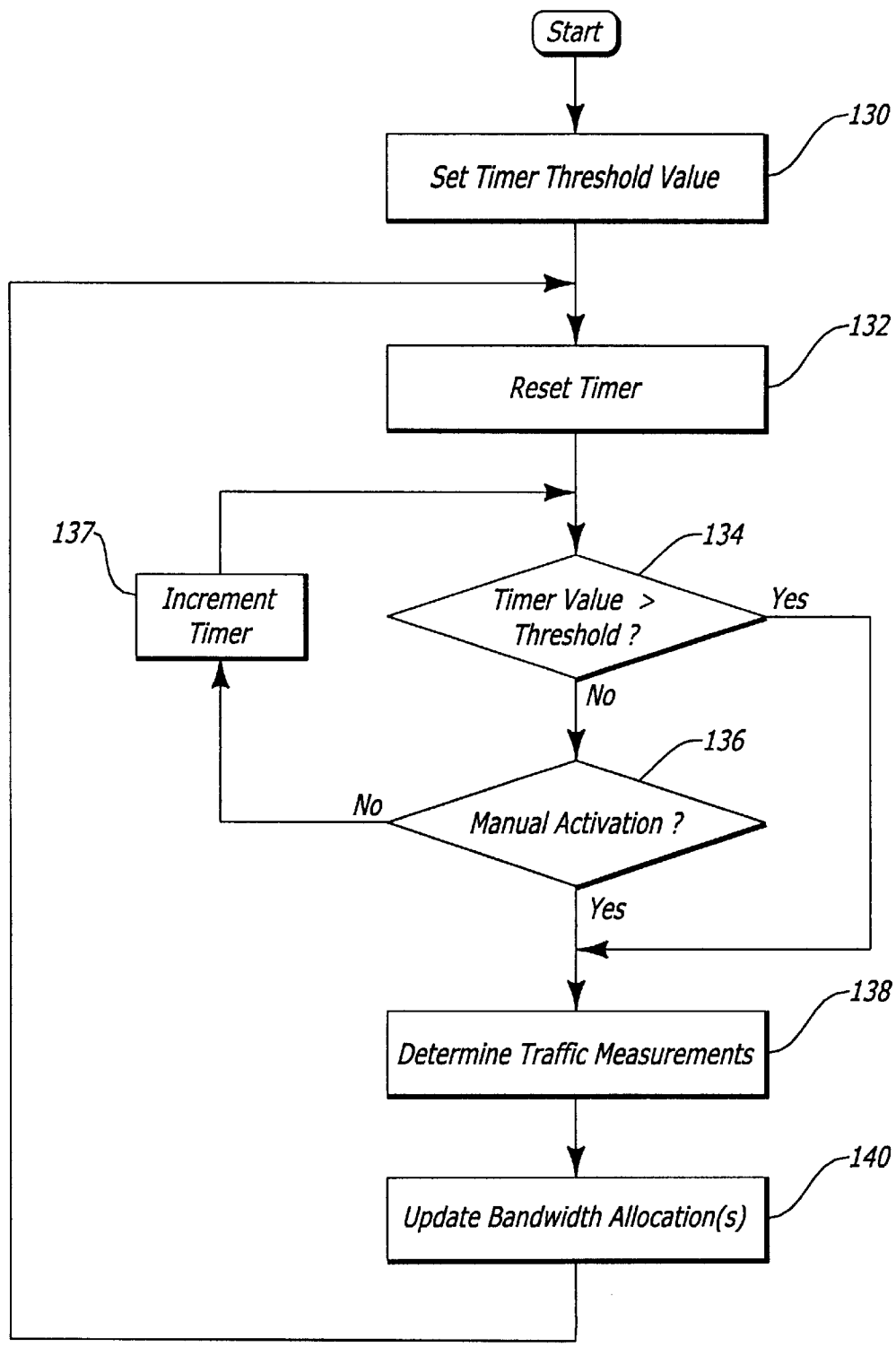
FIG. 8 illustrates an embodiment of a procedure for determining when to update an allocation factor or other variables.

FIG. 8 illustrates an embodiment of a procedure for determining when to update allocation factor f(i) or other variables described in the above procedures. At step 130, a timer threshold value is set. This threshold value is used to trigger an update of the allocation factor or other variables. Typically, the threshold is set to a value at least ten times greater than the duration of the average connection. After setting the timer threshold value, the timer is reset at step 132.

At step 134, the timer value is compared to the threshold value. If the timer value is less than the threshold value, then the procedure continues to step 136 to determine whether a manual activation of the updating function has occurred. A network administrator may perform this manual activation to update bandwidth allocations without waiting for the timer to reach the threshold value. If manual activation is not identified, then the procedure branches to step 137 where the timer is incremented. The procedure then returns to step 134 to compare the new timer value to the threshold value.

If the timer value exceeds the threshold value at step 134 or a manual activation is detected at step 136, the procedure branches to step 138 where traffic measurements are determined. These traffic measurements may be obtained, for example, from a traffic monitoring device similar to rate monitor 16 shown in FIG. 1. At step 140, the procedure may update bandwidth allocations for various service classes in response to the measured traffic flow. After updating bandwidth allocations at step 140, the procedure returns to step 132 to reset the timer.

The mechanisms and procedures discussed above may be utilized by one or more nodes in a network. However, the connection admission control and bandwidth allocation systems discussed above may be transparent to other nodes in the network. Thus, different nodes in the network may utilize different procedures for accepting or rejecting connection requests and for allocating bandwidth.

The examples illustrated and described above are capable of handling multiple classes of service. However, those skilled in the art will appreciate that the teachings of the present invention may be implemented in a device providing support for a single class of service.

In alternative embodiments, the present invention may be applicable to implementations of the invention in integrated circuits or chip sets, wireless implementations, switching systems products and transmission systems products. For purposes of this application, the term switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access muxes, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. A method for controlling admission of a connection request received by a network node, the connection request specifying a class of service, the method comprising the steps of:

determining allocated bandwidth for the specified class of service using an allocation factor associated with the specified class of service, wherein the allocation factor permits oversubscription of the allocated bandwidth;

determining available resources for the specified class of service in response to actual measured traffic flow and the allocated bandwidth;

accepting the connection request if the available resources are capable of supporting the requested connection; and updating the allocated bandwidth for the specified class of service based on the actual measured traffic flow.

2. The method of claim 1 wherein the available resources are further determined in response to subscribed traffic parameters associated with the specified class of service.

3. The method of claim 1 wherein the allocation factor is updated in response to measured traffic flow associated with the specified class of service.

4. The method of claim 1 wherein the step of determining available resources uses a buffer allocation parameter associated with the specified class of service.

5. The method of claim 1 wherein the network node is a switching system product.

6. The method of claim 1 wherein the network node is a transmission system product.

7. The method of claim 1 wherein the network node is an asynchronous transfer mode (ATM) switch.

8. A method for controlling admission of a connection request received by a network node, the connection request specifying a class of service, the method comprising the steps of:

determining available resources for the specified class of service in response to an allocation factor associated with the specified class of service, wherein the allocation factor permits oversubscription of allocated bandwidth and is determined in response to actual measured traffic flow associated with the specified class of service;

accepting the connection request if the available resources are capable of supporting the requested connection; and updating the allocation factor for the specified class of service based on the actual measured traffic flow.

9. The method of claim 8 wherein the allocation factor is determined in response to subscribed traffic parameters and measured traffic flow associated with the specified class of service.

10. The method of claim 8 wherein the allocation factor is updated in response to changes in measured traffic flow associated with the specified class of service.

11. The method of claim 8 wherein the network node is a switching system product.

12. The method of claim 8 wherein the network node is a transmission system product.

13. The method of claim 8 wherein the network node is an asynchronous transfer mode (ATM) switch.

14. A method for controlling admission of connection requests received by a network node, the network node capable of supporting at least one class of service, the method comprising the steps of:

- determining a bandwidth allocation factor associated with each supported class of service, wherein the bandwidth allocation factor permits oversubscription of allocated bandwidth;
- determining available resources for each supported class of service in response to the bandwidth allocation factor associated with the class of service, wherein the bandwidth allocation factor is determined in response to actual measured traffic flow for the associated class of service;
- accepting a particular connection request if the available resources are capable of supporting the requested connection; and
- updating the allocated bandwidth factor for the associated class of service based on the actual measured traffic flow.

15. The method of claim 14 wherein the bandwidth allocation factor is determined in response to subscribed traffic parameters and measured traffic flow associated with the specified class of service.

16. The method of claim 14 wherein each bandwidth allocation factor is updated in response to changes in measured traffic flow for the associated class of service.

17. The method of claim 14 wherein the network node is a switching system product.

18. The method of claim 14 wherein the network node is a transmission system product.

19. The method of claim 14 wherein the network node is an asynchronous transfer mode (ATM) switch.

20. An apparatus for controlling the admission of connection requests received by a network node, comprising:

- a rate monitor coupled to measure traffic flow for classes of service supported by the network node; and
- a connection admission controller coupled to the rate monitor and coupled to receive connection requests, the connection admission controller allocating bandwidth for each supported class of service in response to actual traffic flow measurements, the connection admission controller permiting oversubscription of allocated bandwidth, the connection admission controller identifying available resources and accepting a connection request if the available resources are capable of supporting the connection request, and the connection admission controller updating the allocated bandwidth for each supported class of service based on the actual measured traffic flow.

21. The apparatus of claim 20 further including a queue for each supported class of service, each queue coupled to the rate monitor.

22. The apparatus of claim 20 wherein the connection admission controller updates bandwidth allocation in response to traffic flow measurements by the rate monitor.

23. The apparatus of claim 20 wherein the apparatus is a switching system product.

24. The apparatus of claim 20 wherein the apparatus is a transmission system product.

25. The apparatus of claim 20 wherein the apparatus is an asynchronous transfer mode (ATM) switch.

* * * * *